(No Model.)
T. KIRCHOFF.
AXLE NUT.
No. 601,264. Patented Mar. 29, 1898.
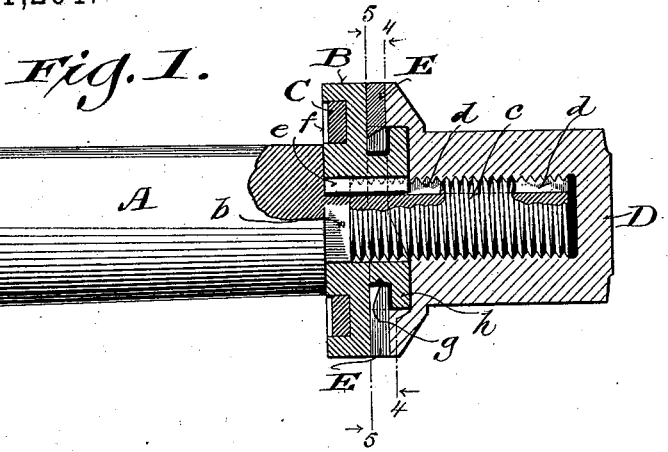
Fig. 1.
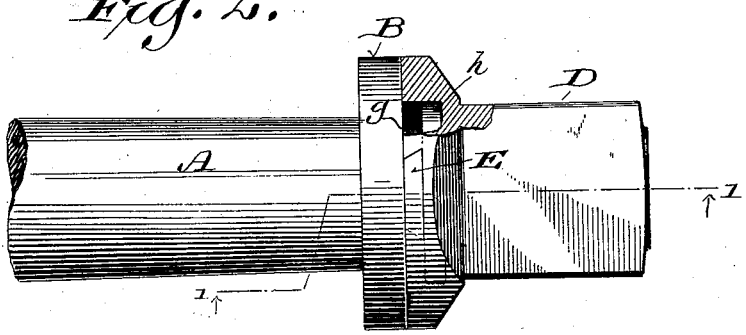
Fig. 2.
Fig. 3. Fig. 4. Fig. 5.
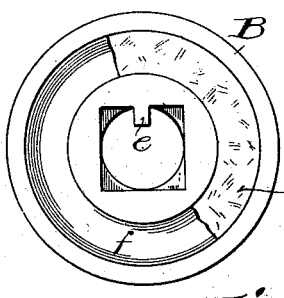 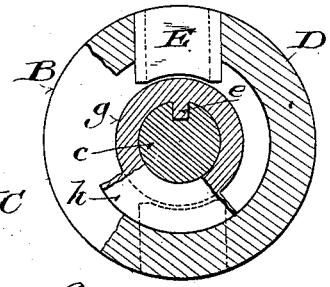 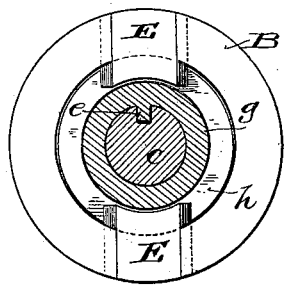
Fig. 6.
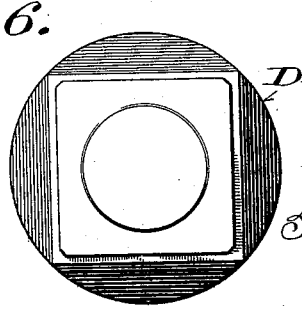
Witnesses:
Geo. W. Young
N. E. Oliphant
Inventor:
Theodor Kirchoff.
By H. G. Underwood
Attorneys

United States Patent Office.

THEODOR KIRCHOFF, OF MILWAUKEE, WISCONSIN, ASSIGNOR OF TWO-THIRDS TO SAMUEL KRAUS AND SANDOR WERTHEIM, OF SAME PLACE.

AXLE-NUT.

SPECIFICATION forming part of Letters Patent No. 601,264, dated March 29, 1898.

Application filed September 26, 1896. Serial No. 607,037. (No model.)

*To all whom it may concern:*

Be it known that I, THEODOR KIRCHOFF, a citizen of the United States, and a resident of Milwaukee, in the county of Milwaukee and State of Wisconsin, have invented certain new and useful Improvements in Securing Axle-Nuts; and I do hereby declare that the following is a full, clear, and exact description thereof.

My invention has for its object to prevent axle-nuts from working loose and being lost. Therefore it consists in certain peculiarities of construction and combination of parts hereinafter set forth with reference to the accompanying drawings and subsequently claimed.

Figure 1 of the drawings represents my improvements in connection with an axle, certain of the parts being in section on the plane indicated by line 1 1 in the succeeding figure and others of said parts broken away; Fig. 2, an elevation of a portion of the axle provided with a combined washer and nut in accordance with my invention; Fig. 3, a rear elevation of the washer, showing a packing-ring therein partly broken away; Figs. 4 and 5, detail partly-sectional views indicated by lines 4 4 and 5 5 in the first figure, and Fig. 6 a front elevation of the nut.

Referring by letters to the drawings, A represents a portion of a vehicle-axle that has a squared reduction *b* and screw-threaded prolongation *c* at each end thereof. As herein shown, each squared and threaded extremity of the axle may be provided with a longitudinal groove *d* for the loose engagement of a spline *e*, that constitutes part of a washer B and comes within the bore of the same. The washer-bore is squared at its inner end to fit upon the corresponding reduction *b* of the axle, and seated in an annular recess *f* of the washer is the usual packing-ring C for contact with the outer end of a hub-box. An outer annular extension *g* of the washer is provided with a flange *h*, and this flanged extension of said washer comes within a corresponding counterbore of a nut D, that is run on the adjacent screw-threaded portion of the axle. Dovetail radial recesses in the rim of the counterbored portion of the nut are engaged by corresponding keys E, that are driven in to come between the washer B and the flange *h* of its extension, whereby said nut and washer are held together, the fit of the keys being tight. The keys are designed to come flush with the nut-rim and not interfere with its rotation when the same is adjusted on an axle, but the washer being in spline-and-groove connection with the axle and square-seated thereon it is held against rotation, although having movement longitudinally of said axle coincident to adjustment of said nut.

Inasmuch as the washer is held to the nut against rotation on the axle, as above specified, said nut cannot be accidentally started to unscrew by friction or jar, as often happens when nuts and washers of the ordinary construction are utilized.

While the washer has been shown splined to the axle, it may be otherwise held in sliding non-rotative engagement therewith.

Having thus described my invention, what I claim as new, and desire to secure by Letters Patent, is—

1. The combination of the axle A having each end thereof provided with a squared reduction *b* and screw-threaded prolongation *c*, the washer B having a portion of its bore squared to fit said squared reduction of the axle and provided with an outer annular extension *g* having the flange *h*, the nut D run on the axle prolongation and provided with a rim having dovetail radial recesses, and the keys E adjustable in said recesses to come inside said flange of the washer.

2. The combination of the axle A having each end thereof provided with a squared reduction *b* and screw-threaded longitudinally-grooved prolongation *c*, the washer B having a portion of its bore squared to fit said squared reduction of the axle and provided with an outer annular extension *g* flange *h* and groove-engaging spline *e*, the nut D run on the axle prolongation and provided with a rim having dovetail radial recesses, and the keys E adjustable in said recesses to come inside said flange of the washer.

In testimony that I claim the foregoing I have hereunto set my hand, at Milwaukee, in the county of Milwaukee and State of Wisconsin, in the presence of two witnesses.

THEODOR KIRCHOFF.

Witnesses:
GEO. A. BENTOR,
N. E. OLIPHANT.